E. I. DODDS.
STAY BOLT.
APPLICATION FILED SEPT. 21, 1912.
1,077,048.
Patented Oct. 28, 1913.
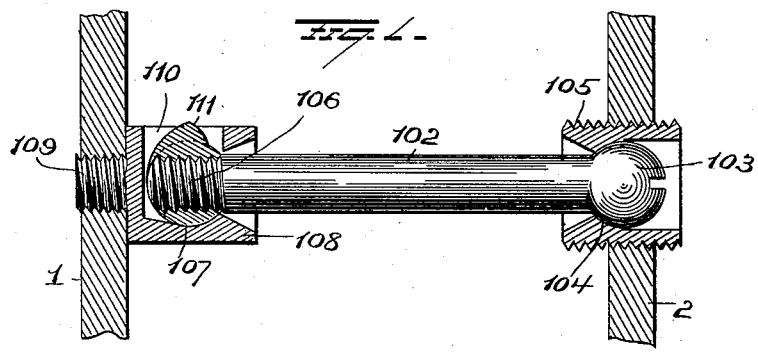
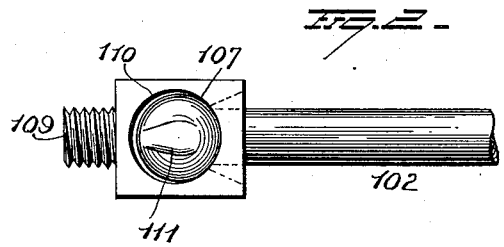
WITNESSES
INVENTOR
E. I. Dodds
By H. A. Seymour
Attorney

UNITED STATES PATENT OFFICE.

ETHAN I. DODDS, OF CENTRAL VALLEY, NEW YORK, ASSIGNOR, BY MESNE ASSIGNMENTS, TO FLANNERY BOLT COMPANY, OF PITTSBURGH, PENNSYLVANIA.

STAY-BOLT.

1,077,048.      Specification of Letters Patent.      Patented Oct. 28, 1913.

Original application filed September 25, 1911, Serial No. 651,051. Divided and this application filed September 21, 1912. Serial No. 721,670.

*To all whom it may concern:*

Be it known that I, ETHAN I. DODDS, a citizen of the United States, residing at Central Valley, in the county of Orange and State of New York, have invented certain new and useful Improvements in Stay-Bolts; and I do hereby declare the following to be a full, clear, and exact description of the invention, such as will enable others skilled in the art to which it appertains to make and use the same.

This invention relates to flexible bolts such as are employed for connecting the outside and inside plates of locomotive and other boilers, and is a division of application Serial Number 651,051, filed September 25th, 1911.

The object of the invention is to provide an improved stay bolt capable of a universal angular movement or yield at or near both ends thereof, so that the stay-bolt will be relieved of any vibration due to the expansion of the fire-box and crown sheets, and permitting the sheets to expand and contract at will.

Another object of the invention is to provide a stay-bolt that can readily be applied from the inside without the trouble and expense of dismantling the engine, and can be adjusted at any time, if necessary.

In the accompanying drawing Figure 1 is a view in longitudinal section of a bolt embodying my invention, and Fig. 2 is a view in plan of the connector block and adjacent end of the bolt.

1 represents the inside plate of a locomotive boiler, 2 the outside plate.

The bolt shank 102 is solid, and is provided at one end with an integral spherical head 103 engaging a concave seat 104 in a bushing 105 screwed into a hole in the wall 2. The opposite end of the shank 102 is threaded at 106, into a ball shaped head 107, which rests within a recess in the connector block 108, and against a concave seat in said recess, and the connector block is provided with a threaded shank 109 secured within a threaded opening in wall 1. For the purpose of assembling and adjustment, the connector is formed with an opening 110 through its upper end through which the head 107 is introduced, and the latter has formed on its upper side a projecting lug 111 that will permit of a rocking movement of the head to the extent required for the angular movement of the bolt, but will prevent a complete turning movement of the head in its seat, by the engagement of the lug 111 with the side walls of the opening 110.

In assembling the parts the head 107 is dropped into its seat through the opening 110, after which the bolt shank 102 is passed through the bushing 105 and then threaded into the head 107.

It is evident that many slight changes might be resorted to in the relative arrangement of parts shown and described without departing from the spirit and scope of my invention as set forth in the claims annexed. Hence I would have it understood that I do not wish to confine myself to the exact construction and arrangement of parts shown and described, but Having fully described my invention what I claim as new and desire to secure by Letters-Patent, is:—

1. A stay bolt consisting of a bolt shank having a threaded end, a connector for attachment to a wall or plate, and having a recess open at one side and also at the end, the opening at the side being of size to admit the bolt head and the opening at the end being for the passage of the threaded end of the bolt shank and a bolt head threaded to engage the threaded end of the bolt shank and provided with a lug adapted to engage the walls of the recess in the connector for limiting the turning movement of the head independently of the connector.

2. A stay bolt consisting of a bolt shank having an integral head at one end and threaded at its opposite end, a head having a threaded opening to receive the threaded end of the bolt shank, the said head having a projecting lug, a connector provided with a threaded stem for connection with a wall or plate and having a recess, open at one side to receive the head, and also having an opening at the end for the passage of the bolt shank, the construction being such that the lug on the head prevents a complete rotation of the head in the connector and a bushing for connecting the other end of the bolt shank to another wall or plate.

In testimony whereof, I have signed this specification in the presence of two subscribing witnesses.

ETHAN I. DODDS.

Witnesses:
A. W. BRIGHT,
GEO. F. DOWNING.